Dec. 18, 1934.　　　　J. WRIGHT　　　　1,984,390

NAVIGATING INSTRUMENT

Filed June 1, 1934　　　2 Sheets-Sheet 1

INVENTOR
JERAULD WRIGHT

Dec. 18, 1934.  J. WRIGHT  1,984,390
NAVIGATING INSTRUMENT
Filed June 1, 1934  2 Sheets-Sheet 2

INVENTOR
JERAULD WRIGHT
BY Harold Dodd.
ATTORNEY

Patented Dec. 18, 1934

1,984,390

UNITED STATES PATENT OFFICE 1,984,390

NAVIGATING INSTRUMENT

Jerauld Wright, United States Navy

Application June 1, 1934, Serial No. 728,560

3 Claims. (Cl. 33—76)

(Granted under the act of March 3, 1883, as amended April 30, 1928; 370 O. G. 757)

This invention relates to an instrument for solving navigational problems and particularly those that involve vector quantities.

It is the object of this invention to provide a device of the kind mentioned that will serve for making rapid, accurate solutions of many of the problems encountered in maneuvering surface craft and in determining courses, ground speeds and distances made good in aircraft.

Figure 1:
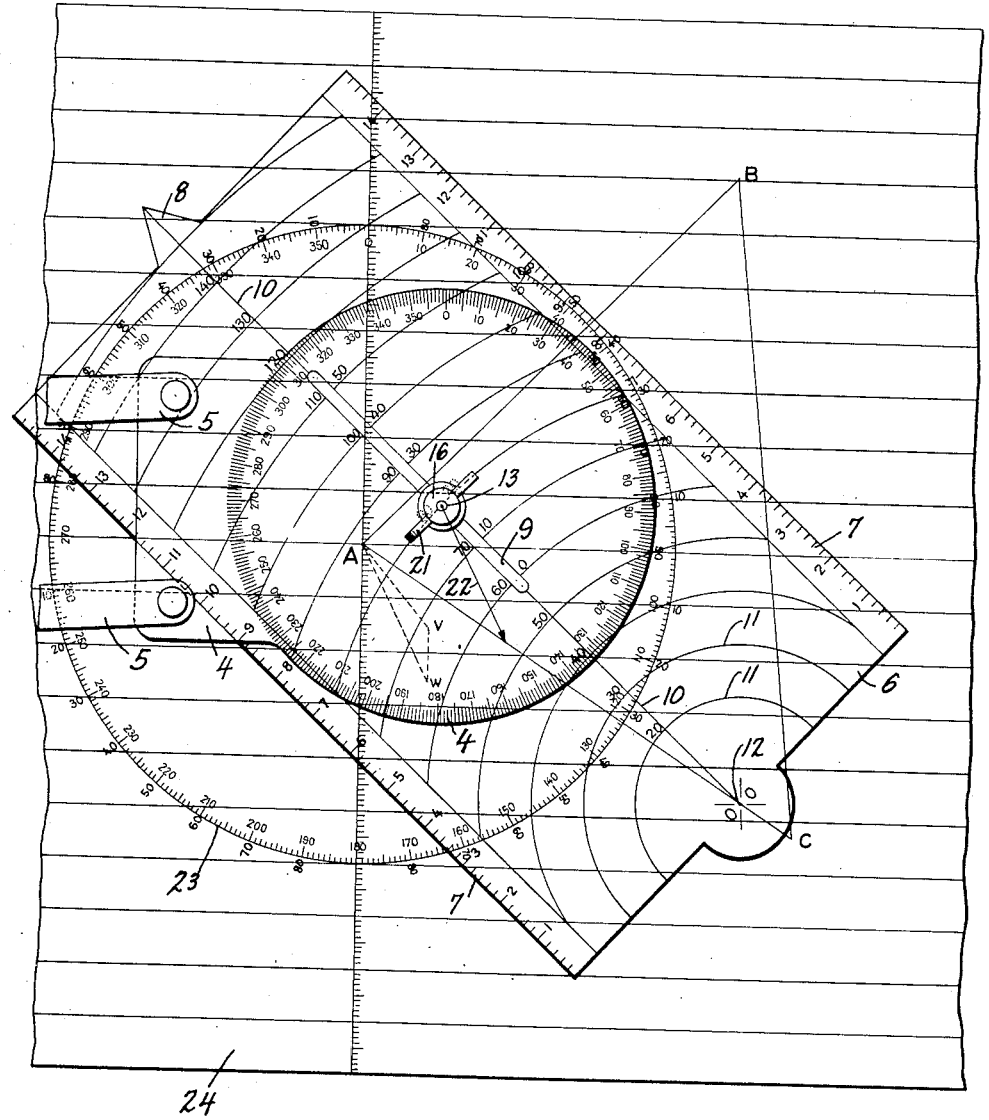
Fig. 1 is a plan view of my invention as associated with an aircraft plotting sheet.

The compass rose 4, having its upper face roughened to be readily marked upon, is supported by any suitable parallel motion device, which forms no part of this invention and is therefore not shown, having arms 5 pivotally connected to compass rose 4 whereby the orientation of the rose is maintained constant while being moved over the plotting sheet or mooring board. It is preferable, but not essential, that the zero point of compass rose 4 should be toward the true north on the plotting sheet.

Associated with compass rose 4 is a member 6 having parallel sides 7 calibrated for use in measuring distances and at one end a pointed tongue 8 projecting therefrom, which tongue is always directed toward the point to which own ship is to proceed. In the member 6 is a median, longitudinally disposed slot 9 whereof the longitudinal center line is extended or produced by lines 10. Concentric speed indicating lines 11 have their centers at the point 12 on line 10.

Figure 3:
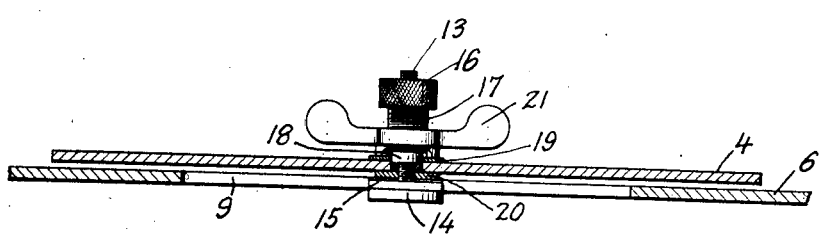
Fig. 3 is a sectional view through the means for securing together the two principal parts of the device.

The means for securing compass rose and member 6 together is shown in Fig. 3. The bolt 13 has a large head 14 with a diametrically disposed rib 15 on the inner face thereof that lies in slot 9. Engaged with the threads of bolt 13 is a nut 16 having a long sleeve portion 17 that is externally threaded and has a reduced portion 18 at its free end that passes through washer 19 lying on compass rose 4 and also through the center of the rose itself and is adapted to bear against washer 20 lying on member 4. A wing nut 21 is engaged with the external threads on sleeve portion 17. When nut 16 is screwed down it clamps member 6 between washer 20 and head 14 and prevents sliding movement of member 6 with respect to compass rose 4 while leaving the member 6 free to rotate, since portion 18 turns readily in the hole through compass rose 4. Tightening wing nut 21 down binds the compass rose and member 6 together so that the member 6 can neither rotate nor slide and hence can be fixed in any angular position.

Figure 2:
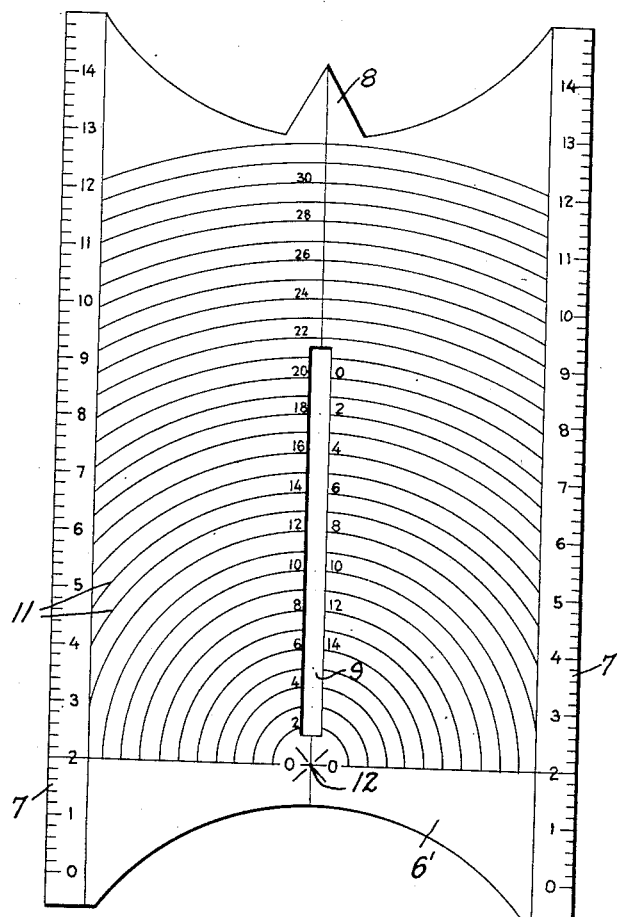
Fig. 2 is a plan view of a part that is substituted in the device of Fig. 1 when mooring board or maneuvering problems of surface craft are to be solved.

In Fig. 1 the speed circle calibrations extend along the lefthand side of slot 9 and the numerals representing the scalar values of vectors lie along the righthand side thereof and increase in value in the same direction as do the speed calibrations. This arrangement is used in navigating aircraft which involves movement of the air with respect to the craft in such manner as to affect the course thereof. In Fig. 2, the member 6' is intended for use on surface craft and the numerals upon the righthand side of slot 9 representing the rate of movement of another craft involved in the problem increase in the direction opposite the numerals on the righthand side of slot 9 representing the speed of own ship.

As an example of the use of my invention let it be supposed that an aircraft were ordered to fly the course ABC, Fig. 1, taking off from the carrier at A, the wind blowing toward 153° with a velocity of 30 miles per hour and the speed of the aircraft being 80 miles per hour. The member 6 is turned to cause line 10 to coincide with the 153° mark on compass rose 4 and is clamped with the line corresponding to the 30-mile wind speed calibration upon the right hand side of slot 9 passing through the center of bolt 13 and a vector 22 is drawn in the direction of the wind and with a length representing 30 miles. The course ABC is laid off with the point of departure at the center of compass rose 23 on plotting sheet 24. The nut 16 is then loosened and member 6 is slid so the 80-mile air speed calibration line passes through the center of bolt 13, the nut 16 being then tightened to prevent sliding of member 6 but permit rotation thereof. The member 6 is rotated and the compass rose is shifted to cause the zero point 12 and the outer end of vector 22 to lie upon the line AB with the point 8 extending toward B. The heading will then be given on compass rose 4 by the point at which the line 10 crosses the edge thereof and the distance made good per hour is represented by the distance from center point 12 to the point of vector 22. The device is shown in Fig. 1 as positioned for computing the heading and ground speed of the craft while flying from C to A. It will be observed that although the course from C to B is 302° as shown on plotting sheet 24, due to the effect of the wind the craft must be steered on a course that is 313°. The distance made good per hour is shown by the point of vector 22 on line CA as being about 55 miles per hour. If the carrier were to move from A on a course 0° at a speed of 10 miles per hour the vector 20 would be not represented by the dotted line A$w$ but by the dotted line A$v$, and the vector 22 on compass rose 4 would be changed to correspond.

In using the member 6' for maneuvering problems the calibrations upon the right hand side of slot 9 may represent the speed of a guide and those upon the left hand side represent the speed of own ship but in this case the movement along the vector drawn on compass rose 4 is toward the center. Many other uses will readily suggest themselves to those skilled in the art of navigation.

Compass rose 4 and member 6 are made of some transparent material that is not readily broken, such as celluloid or the like.

The invention described herein may be manufactured and used by or for the Government of the United States of America for governmental purposes without the payment of any royalties thereon or therefor.

I claim:

1. A navigational instrument, comprising a transparent compass rose mounted to be freely movable in a plane while maintaining a constant orientation, said rose having a surface adapted to be marked upon, a clamping pivot passing through the center of said rose, a member having a longitudinal slot in which said pivot is slidable and parallel opposite sides, said pivot having elements to clamp said member against sliding while permitting rotation thereof and other elements to clamp said member against rotation also, said member having on it a plurality of arcs of concentric circles whereof the center is alined with the median longitudinal line of the slot in said member.

2. A navigational instrument, comprising a transparent compass rose mounted to be freely movable in a plane while maintaining a constant orientation, said rose having a surface adapted to be marked upon, a member having parallel sides and a median longitudinal slot, means extending through said slot and the center of said rose releasable to permit sliding movement and rotation of said member with respect to said rose and having portions to lock said member against sliding movement while permitting rotation and also to lock said member against rotation as well as sliding.

3. A navigational instrument, comprising a transparent compass rose mounted to be freely movable in a plane while maintaining a constant orientation, said rose having a surface adapted to have a vector drawn thereon with an end thereof at the center of said rose, securing means passing through the said center, and a member held in operative relation to said rose by said securing means, said member having a slot through which said securing means passes to permit said member to be either translated or rotated or both, with respect to said rose and said member also having on it a plurality of speed indicating circles with a common center lying on the median longitudinal line of said slot produced, whereby, when said securing means is set with respect to said member to indicate a speed the said median line and a vector on said rose may be disposed with respect to a line representing a vector to complete a vector triangle, the scalar magnitude of the vector represented by said last mentioned line being measured by said circles.

JERAULD WRIGHT.